(12) United States Patent  
Tico et al.

(10) Patent No.: US 7,860,343 B2  
(45) Date of Patent: Dec. 28, 2010

(54) CONSTRUCTING IMAGE PANORAMA USING FRAME SELECTION

(75) Inventors: Marius Tico, Tampere (FI); Markku Vehviläinen, Tampere (FI); Jani Boutellier, Oulu (FI); Olli Silven, Oulu (FI)

(73) Assignee: Nokia Corporation, Espoo (FI)

( * ) Notice: Subject to any disclaimer, the term of this patent is extended or adjusted under 35 U.S.C. 154(b) by 1040 days.

(21) Appl. No.: 11/402,306

(22) Filed: Apr. 10, 2006

(65) Prior Publication Data

US 2007/0237423 A1    Oct. 11, 2007

(51) Int. Cl.  
    *G06K 9/36* (2006.01)
(52) U.S. Cl. .......................... 382/284; 348/36
(58) Field of Classification Search ............... 348/36; 382/284  
    See application file for complete search history.

(56) References Cited

U.S. PATENT DOCUMENTS

| | | | |
|---|---|---|---|
| 5,999,662 A * | 12/1999 | Burt et al. ................ 382/284 |
| 6,075,905 A | 6/2000 | Herman et al. | |
| 6,356,297 B1 | 3/2002 | Cheng et al. | |
| 6,807,306 B1 | 10/2004 | Girgensohn et al. | |
| 6,901,110 B1 | 5/2005 | Tsougarakis et al. | |
| 6,930,703 B1 | 8/2005 | Hubel et al. | |
| 2002/0075389 A1 * | 6/2002 | Seeger et al. ............. 348/222 |
| 2005/0063608 A1 | 3/2005 | Clarke et al. | |
| 2005/0206743 A1 | 9/2005 | Sim et al. | |
| 2005/0219362 A1 * | 10/2005 | Garoutte .................. 348/180 |
| 2005/0244033 A1 * | 11/2005 | Ekin et al. ............... 382/103 |
| 2005/0286802 A1 * | 12/2005 | Clark et al. ............. 382/286 |
| 2007/0103544 A1 * | 5/2007 | Nakazawa .................. 348/38 |
| 2007/0160283 A1 * | 7/2007 | Saphier et al. ........... 382/152 |

FOREIGN PATENT DOCUMENTS

| EP | 0 930 584 B1 | 10/2005 |
|---|---|---|
| JP | 5110926 | 4/1993 |
| JP | 5110926 (A) * | 4/1993 |

(Continued)

OTHER PUBLICATIONS

Creating a Precise Panorama from Panned Video Sequence Images, Xueying Qin, Eihachiro Nakamae and Katsumi Tadamura, Proceedings, Seventh Pacific Conference on Computer Graphics and Applications, 1999, Oct. 5-7, 1999 pp. 6-11, 314.

(Continued)

*Primary Examiner*—Sath V Perungavoor  
*Assistant Examiner*—Gregory F Cunningham

(57) ABSTRACT

A new method, system, apparatus and software product for constructing by an electronic device an image panorama from a plurality of images based on their visual quality is presented. The same portion of a panoramic image scene is typically captured on multiple neighborhood video frames from which one can choose the best visual representation to be pasted into the panorama. Constructing the image panorama from the plurality of captured images can comprise the following steps: a) evaluating image quality of K consecutive frames out of the captured plurality of images using a predetermined criterion, b) selecting one image out of the evaluated K frames with the best image quality using a predetermined rule, and c) appending the selected frame to previously selected frames for constructing the image panorama. On-line and off-line implementations are possible.

33 Claims, 7 Drawing Sheets

FOREIGN PATENT DOCUMENTS

| | | | |
|---|---|---|---|
| JP | 2003-354185 | | 12/2000 |
| JP | 2000354185 (A) | * | 12/2000 |
| JP | 2003198902 | | 7/2003 |
| JP | 2003198902 (A) | * | 7/2003 |
| WO | WO 0167205 A2 | | 9/2001 |
| WO | WO 2004/049257 A2 | | 6/2004 |
| WO | 2005/032125 | | 4/2005 |
| WO | WO 2005/032125 A1 | * | 4/2005 |
| WO | WO 2005041564 A1 | | 5/2005 |
| WO | WO 2006002796 A1 | | 1/2006 |

OTHER PUBLICATIONS

Image Registration Methods: a Survey, Jan Flusser, Department of Image Processing, Institute of Information Theory and Automation, Academy of Sciences of the Czech Republic, Image and Vision Computing 21 (2003) 977-1000.

Supplementary European Search Report completed Nov. 30, 2009 in parallel European Application No. 077055604.2 (1 page).

Japanese Office Action in parallel Japanese Application No. 2009-504838, mailed Jun. 22, 2010 (2 pages) together with English translation thereof (3 pages).

English Abstract of Japanese Unexamined Patent Publication No. 2003-198902, Sony Corp., Jul. 11, 2003 (1 page).

English Abstract of Japanese Unexamined Patent Publication No. 2003-354185, Olympus Optical Co., Dec. 19, 2000 (1 page).

English Abstract of Japanese Unexamined Patent Publication No.5-110926, Matsushita Ind. Co. Ltd., Apr. 30, 1993 (1 page).

* cited by examiner

CONSTRUCTING IMAGE PANORAMA USING FRAME SELECTION

TECHNICAL FIELD

This invention generally relates to electronic imaging, and more specifically to constructing an image panorama from a plurality of images.

BACKGROUND ART

An image panorama (or image mosaicing) is commonly used to increase the visual field of a camera by pasting together several images. Many approaches for creating an image panorama from a series of overlapping image frames have been proposed. In general the process of combining the image frames into an image panorama consists of: (i) registering all available image frames with respect to the coordinates of one of the frames, called the reference frame, and (ii) adjusting the colors of image pixels located in the overlapping areas of one or more frames in order to have a smooth transition between image regions captured in different frames.

Most of the prior art methods comprise of simply pasting together all available image frames, i.e., using all available image frames captured from the scene in order to create the image panorama, without selecting only the best visual quality frames for this purpose. These methods assume that the source images for the image panorama are of good quality during creating the image panorama. Practically this is not the case, since pictures are often taken freehand, which leads to blurred images in many occasions.

DISCLOSURE OF THE INVENTION

According to a first aspect of the invention, a method for constructing by an electronic device an image panorama from a plurality of images, comprises: evaluating image quality of K consecutive frames out of the plurality of images using a predetermined criterion, wherein K is an integer of at least a value of two; selecting one frame out of the evaluated frames with the best image quality using a predetermined rule; and appending the one frame to other selected frames for constructing the image panorama.

According further to the first aspect of the invention, K may be a predetermined number of a constant value.

Further according to the first aspect of the invention, K may be variable. Further, K may be selected in response to an amount of motion of a sensor capturing the K consecutive frames during the capturing using a pre-selected criterion. Further still, K may be assigned an initial value and then is iterated during the evaluating by monitoring a relative motion speed of features in adjacent frames using a pre-selected rule. Yet still further, using the pre-selected rule, K may be increased by a pre-selected value when the relative motion speed is smaller than a threshold value or K may be decreased by a further pre-selected value when the relative motion speed is larger than a further threshold value.

Still further according to the first aspect of the invention, the electronic device may comprise a memory for storing the plurality of images to perform the steps of evaluating, selecting and appending.

According further to the first aspect of the invention, the electronic device may be configured to access the plurality of images through network communications.

According still further to the first aspect of the invention, during the evaluating image quality of the K consecutive frames only one frame at a time may be saved in a memory of the electronic device.

According further still to the first aspect of the invention, the evaluating image quality for each of the K consecutive frames may use the predetermined criterion by evaluating at least one of the following four image characteristics: a) a sharpness, b) a registration accuracy, c) an amount of overlap with other frames, d) a type and an amount of motion. Further, the predetermined criterion may comprise all four image characteristics.

According yet further still to the first aspect of the invention, the electronic device may be a digital camera, a communication device, a wireless communication device, a portable electronic device, a mobile electronic device or a camera phone.

Yet still further according to the first aspect of the invention, the boundary of the selected frame may be excluded and substantially only a central part of the selected frame is appended to the other selected frames.

Still yet further according to the first aspect of the invention, the selected frame may be stored after the selecting and appended to the image panorama only after all frames to be appended to the image panorama out of the plurality of images are selected.

Still further still according to the first aspect of the invention, the one frame may be appended to previously selected frames right after the selecting.

According to a second aspect of the invention, a computer program product comprises: a computer readable storage structure embodying computer program code thereon for execution by a computer processor with the computer program code, characterized in that it includes instructions for performing the steps of the first aspect of the invention, indicated as being performed by any component of the electronic device.

According to a third aspect of the invention, an electronic device adopted for constructing an image panorama from a plurality of images, comprises: a frame image quality evaluation module, for evaluating image quality of K consecutive frames out of the plurality of images using a predetermined criterion, wherein K is an integer of at least a value of two; a frame selection module, for selecting one frame out of the evaluated frames with the best image quality using a predetermined rule; and an image panorama construction block, for appending the one frame to other selected frames for constructing the image panorama.

According further to the third aspect of the invention, the electronic device may be configured to store the selected frame after the selecting and to append the selected frame to the image panorama only after all frames to be appended to the image panorama out of the plurality of images are selected.

Further according to the third aspect of the invention, the electronic device may be configured to append the one frame to previously selected frames right after the selecting.

Still further according to the third aspect of the invention, K may be a predetermined number of a constant value.

According further to the third aspect of the invention, K may be variable. Further, K may be selected in response to an amount of motion of a sensor capturing the K consecutive frames during the capturing using a pre-selected criterion. Further still, K may be assigned an initial value and then is iterated during the evaluating by monitoring a relative motion speed of features in adjacent frames using a pre-selected rule.

According still further to the third aspect of the invention, the electronic device may further comprise: a memory for storing the plurality of images for performing the evaluating, selecting and appending.

According yet further still to the third aspect of the invention, the electronic device may be configured to access the plurality of images through network communications. Further, during the evaluating image quality of the K consecutive frames only one frame at a time may be saved in a memory of the electronic device.

According further still to the third aspect of the invention, the evaluating image quality for each of the K consecutive frames uses the predetermined criterion by evaluating at least one of the following four image characteristics: a) a sharpness, b) a registration accuracy, c) an amount of overlap with other frames, d) a type and an amount of motion.

According further still to the third aspect of the invention, the electronic device may be a digital camera, a communication device, a wireless communication device, a portable electronic device, a mobile electronic device or a camera phone.

According to a fourth aspect of the invention, a system adopted for constructing an image panorama from a plurality of images, comprises: means for capturing the plurality of images; and an electronic device, comprises: a frame image quality evaluation module, for evaluating image quality of K consecutive frames out of the plurality of images using a predetermined criterion, wherein each of the K consecutive frames is provided to the electronic device through a network communication, and K is an integer of at least a value of two; a frame selection module, for selecting one frame out of the evaluated frames with the best image quality using a predetermined rule; and an image panorama construction block, for appending the one frame to other selected frames for constructing the image panorama.

According further to the fourth aspect of the invention, the network communications may be network communications over Internet.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1A:
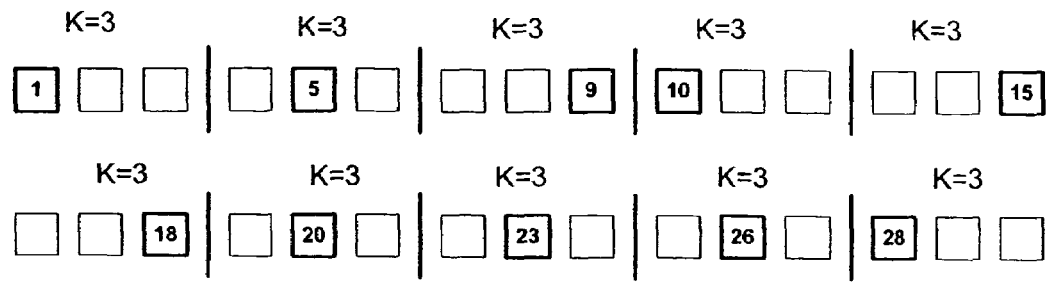
FIG. 1a is schematic representation of an example of dividing the available image frames in small groups of 3 frames each, according to an embodiment of the present invention.

A new method, system, apparatus and software product are presented for constructing by an electronic device an image panorama from a plurality of images based on their visual quality. In particular, the same portion of a panoramic image scene is typically captured on multiple neighborhood video frames from which one can choose the best visual representation to be pasted into the panorama. The electronic device can be (but is not limited to) a digital camera, a communication device, a wireless communication device, a portable electronic device, a mobile electronic device, a camera phone, etc.

According to embodiments of the present invention, on-line and off-line implementations are possible. An off-line implementation assumes availability of all video frames which are stored on some support (e.g., a memory of the electronic device). These video frames can be also stored externally to the electronic device and accessed through the network communications. On the other hand, an on-line implementation is creating the panorama during capturing the video frames, with minimal memory requirements and possibly involving network communications (e.g., using Internet), i.e., capturing the video frames remotely from the electronic device which then can construct the image panorama. The on-line implementation can be also performed within the same electronic device without involving network connections if the electronic device comprises the means for capturing the plurality of images.

According to an embodiment of the present invention, constructing (or composing) by an electronic device the image panorama from the plurality of captured images can comprise the following steps: a) evaluating image quality of K, K being an integer of at least a value of two, consecutive frames out of the captured plurality of images using a predetermined criterion, b) selecting one image out of the evaluated K frames with the best image quality using a predetermined rule, and c) appending said selected frame to previously selected frames for constructing the image panorama. It is noted that a first frame (or a reference frame) starting the process of constructing the image panorama can be the first frame in the plurality of captured images or it can be the frame chosen among the first group of K frames using the above selection process. In another embodiment, the boundary of the selected frame can be excluded and substantially only a central part of the selected frame is then appended to the previously selected frames in the image panorama.

According to further embodiments of the present invention, K can be a predetermined number of a constant value or K can be variable. If K is variable, it can be varied, e.g., by a degree of motion of a sensor capturing the K consecutive frames during the capturing, using a pre-selected criterion.

The selection of the best frame in each group of consecutive frames can be carried out either using a software approach, and/or based on information received from motion sensors used for monitoring motions of the sensor capturing the plurality of images. In all cases the frames that are captured during time intervals when the camera is less moved will be selected.

According to further embodiments of the present invention, the evaluating image quality (e.g., for a software approach) for each of the K consecutive frames can use the predetermined criterion by evaluating at least one or all of the following four image characteristics: a) a sharpness, b) a registration accuracy, c) an amount of overlap with other frames, and d) a type and an amount of moving objects in the scene. Other image characteristics can be also utilized in establishing the predetermined criterion.

The sharpness of an image frame can be estimated based on the amount of high frequency components it contains. If the high frequency components are missing, it is reasonable to assume that the frame is blurred. This can be evaluated by applying a high-pass spatial filter onto the image, and summing up the absolute values of image pixels after filtering (e.g., using Fourier transform analysis).

Sometimes the frame registration process is not accurate and would lead to distortions in the mosaic (image panorama) if the failure would be left without notice. The registration accuracy is determined by counting the differences in the overlapping areas of the two frames. For robustness to luminance variations this difference can be calculated between the gradient fields of the two frames, wherein the "derivative" function returns the gradient magnitude in each image pixel.

If the area of overlap in the two frames is too small, it increases the possibility of the frame registration failure, although it might appear like the registration has succeeded. On the other hand, if the area of overlap is too large, it means that the new frame does not extend the mosaic image in reasonable amounts. The allowed range for the overlap can be established.

Moving objects captured in the frames chosen for the image panorama can lead to low-quality results. The moving objects often become clipped, or duplicated, when their presence is not known. Thus, if there is much movement in the frame, it is wise to discard the frame and choose another one for the mosaic to avoid problems. The type and amount of motion can be calculated, e.g., by getting the difference in the two consecutive frames, compare the difference image against a threshold to separate a false motion and then determine if there is a motion in the various parts of the image.

Thus, according to one embodiment, the frame image quality can be determined by combining the four parameters presented above using the predetermined rule. An example of applying the selection rule for one parameter is presented below, wherein: P is a previous selected frame, C is a frame to be evaluated, v is a frame quality value (e.g., the bigger the value, the better), c1, c2 are constants, and v is a frame sharpness.

If the frame C contains moving objects and if the moving object of C is not displayed completely, then v=v−c1 for the frame C. If the frame P contains moving objects and if the moving objects of C and P overlap, v=v−c2 for the frame P, otherwise v=v−(area of moving object in C). A larger value of the frame sharpness indicates a better quality image, therefore frame (C or P) with the largest frame sharpness v is chosen.

FIGS. 1-6 present various examples demonstrating different embodiments of the present invention.

FIG. 1a shows an example among others of a schematic representation of dividing the available image frames in small groups of 3 frames each (K=3), according to an embodiment of the present invention. The frames selected in each group for creating the image panorama are numbered in the picture, e.g. the first frame from the first group, fifth frame for the second group, etc. In the example illustrated in the FIG. 1a, the first frame is selected as the reference frame.

Figure 1B:
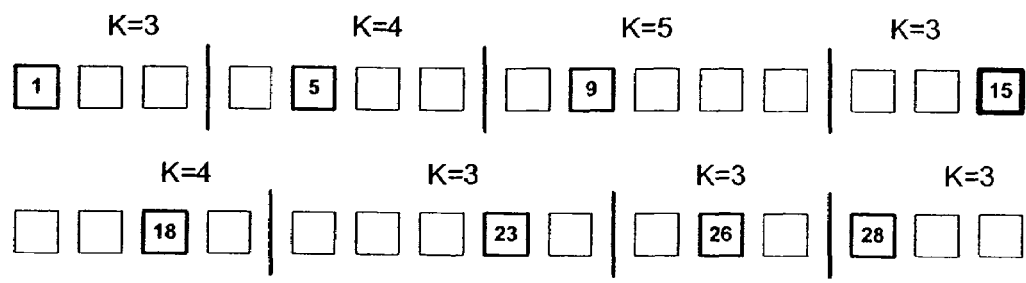
FIG. 1b is schematic representation of an example of dividing the available image frames in small groups of a variable number of frames, according to an embodiment of the present invention.

FIG. 1b shows an example among others of a schematic representation of dividing the available image frames in small groups of a variable number of frames, according to an embodiment of the present invention. Number of frames in the group varies from 3 to 5 in the example of FIG. 1b.

Figure 1C:
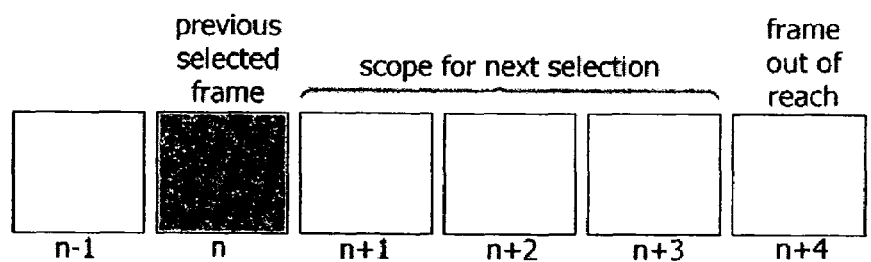
FIG. 1c is another schematic representation of an example of dividing the available image frames in small groups with adaptive estimation of a variable number of frames, according to an embodiment of the present invention.

FIG. 1c shows another example among others of a schematic representation for dividing the available image frames in small groups with adaptive estimation of a variable number of frames, according to an embodiment of the present invention. This example can utilize a pure software approach for adaptive K estimation. The darkened frame has previously been selected and now the successive frames n+1 . . . n+3 are candidates for being selected next. The frame n+4 is too far away and therefore is not included in the selection process. FIG. 1c illustrates that the next frame for the mosaic is selected from a group of K frames that lie within a certain distance from the previously selected frame. It is important to emphasize here that this distance does not represent number of frames but rather it characterizes the displacement between one frame and the previously selected frame. The amount of overlap (overlapping area) between the two frames may be used as an inverse measure of the displacement between the two frames. The value of K is adaptively changed to ensure a minimum amount of overlap O between two consecutively selected frames. For example, if the camera is not moving at all, then the overlap between frames is always larger than O and hence the number K (or the scope for next selection) is infinite. On the other hand, if the camera is moving (e.g., panning), then the amount of overlap with respect to the previously selected frame decreases with each new frame such that at some moment it will drop below the threshold (the minimum amount of overlap) O. Thus the number K (or the scope for next selection) is automatically adapted to the speed of motion, i.e., the minimum amount of overlap O is achieved in a smaller or larger number of frames as the motion is faster or slower, respectively.

Figure 2A:
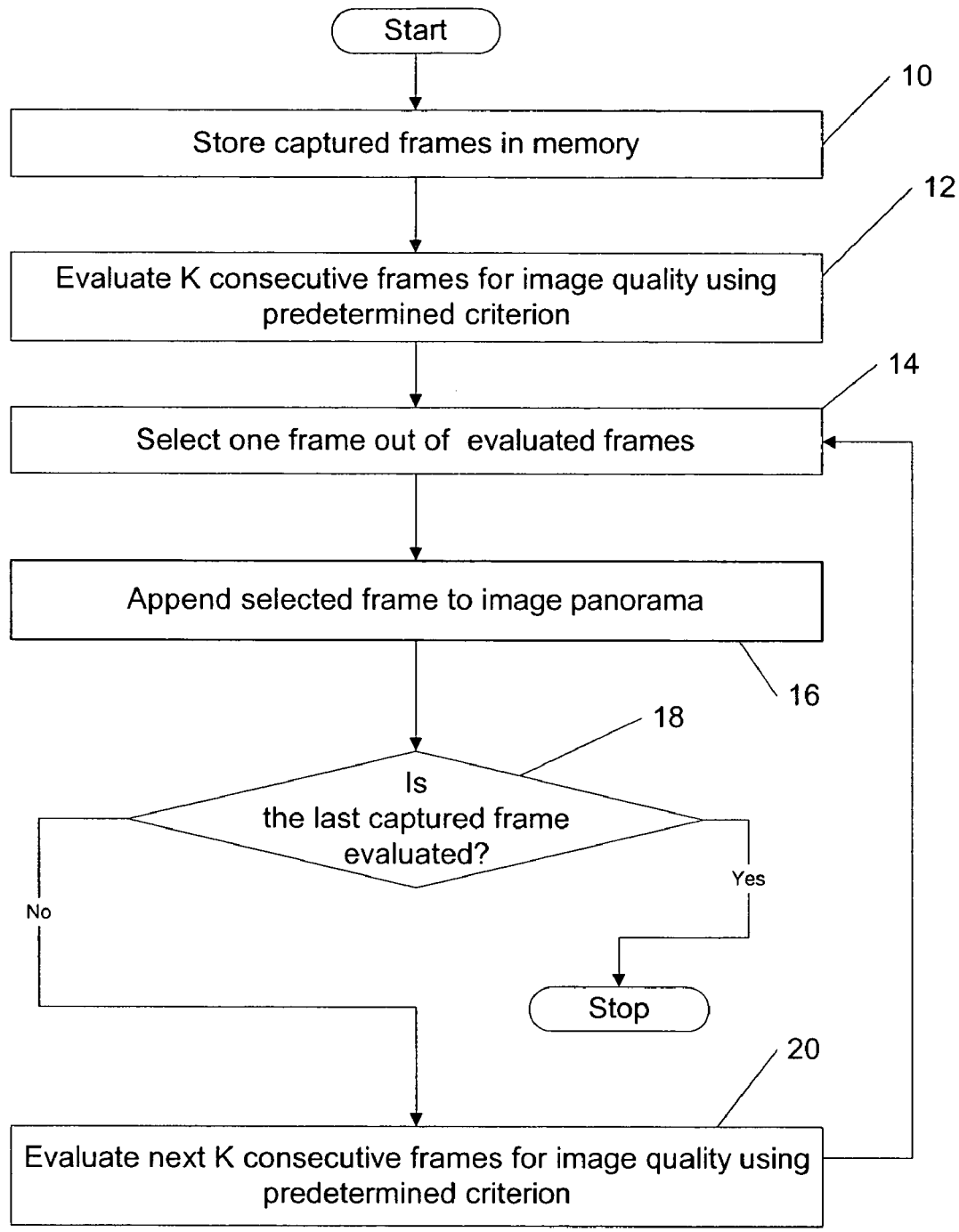
FIG. 2a is a flow chart demonstrating constructing an image panorama from a plurality of images off-line by evaluating a constant number frames in a group (K is constant), according to an embodiment of the present invention.

FIG. 2a shows an example of a flow chart demonstrating constructing an image panorama from a plurality of images off-line by evaluating a constant number of frames in a group (K is constant), according to an embodiment of the present invention.

The flow chart of FIG. 2a only represents one possible scenario among others. Detailed description of the steps depicted in FIG. 2a is provided above. In a method according to an embodiment of the present invention, in a first step 10, captured plurality of images are stored in a memory, e.g., of the electronic device.

In a next step 12, K consecutive frames are evaluated for image quality using the predetermined criterion, according to the embodiments of the present invention. In a next step 14, one frame out of the evaluated frames is selected using the predetermined rule. In a next step 16, the selected frame is appended to the image panorama. It is noted that in some systems, frame capture and selection may take too much processing time to append frames to the image panorama in real-time, immediately after selecting them. In practice the frames, that are selected to be appended to the image panorama, could be also put aside (i.e., stored) until all frames to be appended to the image panorama are selected. After that the selected frames are combined into the image panorama.

In a next step 18, it is ascertain whether the last captured frame is evaluated. If that is the case, the process stops. If, however, it is ascertained that the last captured frame is not evaluated, in a next step 20, next K consecutive frames are evaluated for image quality using the predetermined criterion and the process goes back to step 14.

Figure 2B:
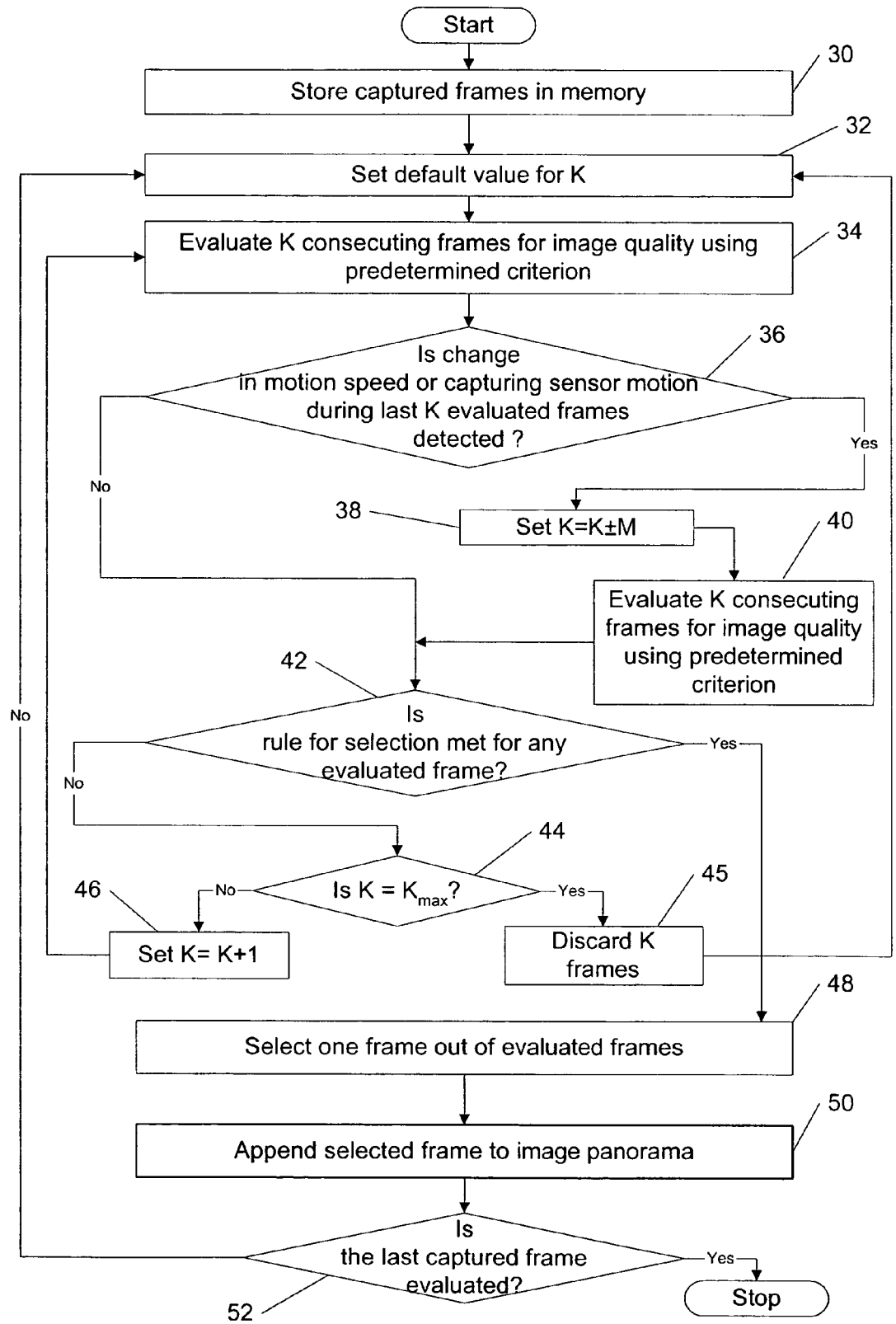
FIG. 2b is a flow chart demonstrating constructing an image panorama from a plurality of images off-line by evaluating a variable number frames in a group (K is variable), according to an embodiment of the present invention.

FIG. 2b shows an example of a flow chart demonstrating constructing an image panorama from a plurality of images off-line by evaluating a variable number of frames in a group (K is not constant), according to an embodiment of the present invention.

The flow chart of FIG. 2b only represents one possible scenario among others. Detailed description of the steps depicted in FIG. 2b is provided above. In a method according to an embodiment of the present invention, in a first step 30, captured plurality of images are stored in a memory, e.g., of the electronic device (or externally). In a next step 32, a default value for K is set (e.g., K=3). In a next step 34, K consecutive frames are evaluated for image quality using the predetermined criterion, according to the embodiments of the present invention.

In a next step 36, it is ascertained whether the change in motion speed or image capturing sensor motion during the last K evaluated frames is detected. If that is the case, in a next step 38, the value of K is set to K=K±M, wherein M is an integer of at least a value of one, and plus or minus depends on the content of the change detected as explained in the examples above. Then in a next step 40, K consecutive frames are evaluated for image quality using the predetermined criterion, according to the embodiments of the present invention, but now K is different than in step 34 (in reality, since results of step 34 can be available, only additional M frames can be evaluated), and then the process goes to step 42.

If, however, it is ascertained in step 36 that the change in motion speed or image capturing sensor motion during last K evaluated frames is not detected, in a next step 42, it is ascertained whether the predetermined rule for the selection is met for any of the evaluated frame. If that is the case, the process goes to step 48. If, however, it is ascertained that the predetermined rules for the selection are not met for any of the evaluated frames, in a next step 44, it is ascertained whether the parameter K is at its maximum allowed value (e.g., predetermined value $K_{max}$). If that is the case, in a next step 45, the K frames can be, e.g., discarded (since none of them meets the predetermined rules) and the process will go back to step 32 and the next group of consecutive frames will be evaluated. If however, it is determined that the parameter K is not at its maximum allowed value, in a next step 46, the value of K is set to K=K+1 and the process proceeds to step 34.

In a step 48, one frame out of the evaluated frames is selected using the predetermined rule. In a next step 50, the selected frame is appended to the image panorama. In a next step 52, it is ascertain whether the last captured frame is evaluated. If that is the case, the process stops. If, however, it is ascertained that the last captured frame is not evaluated, the process goes back to step 32 and the next group of consecutive frames will be evaluated.

Figure 2C:
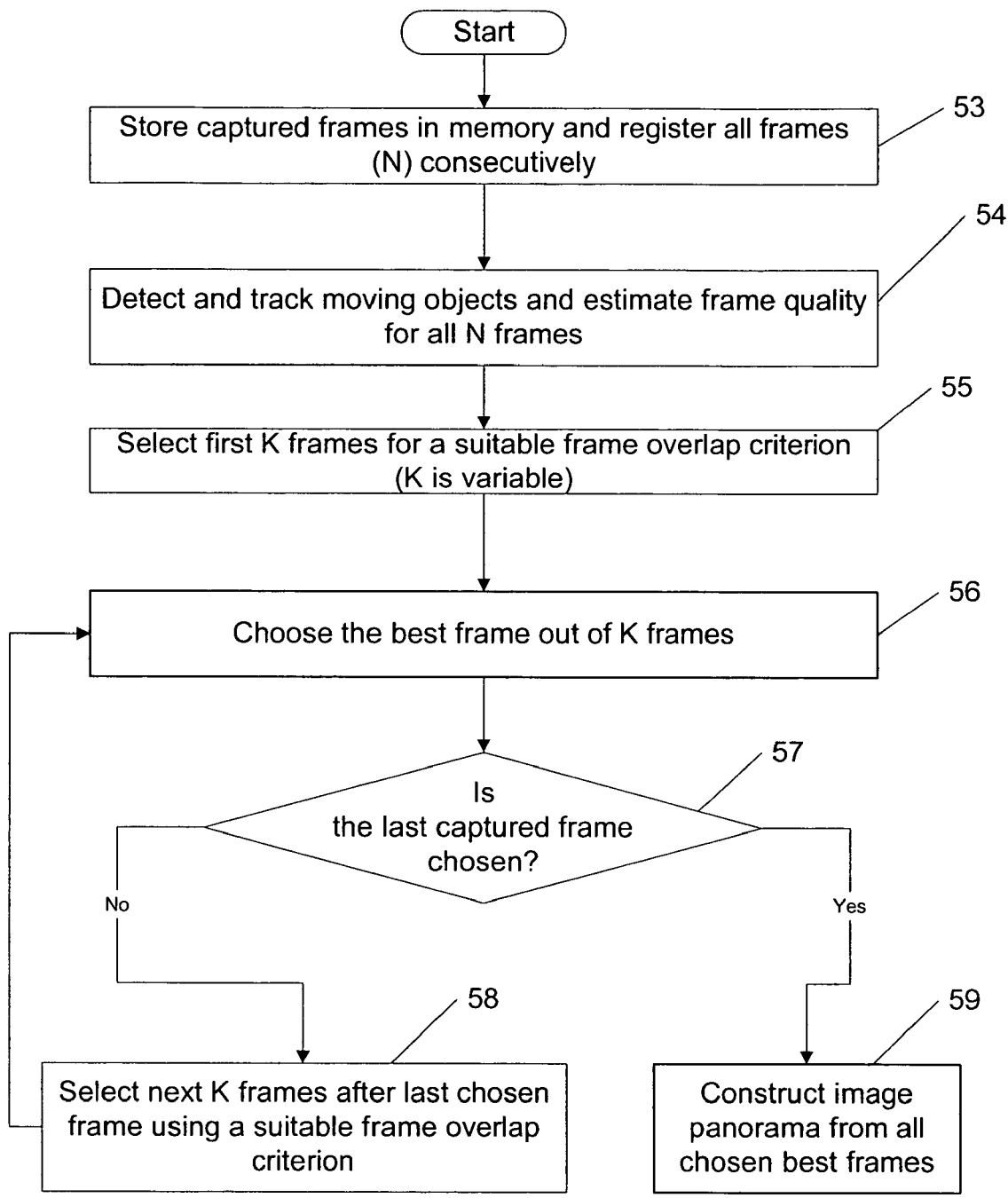
FIG. 2c is a flow chart demonstrating the construction of an image panorama from a plurality of images when the value of K is adaptively changed based on the amount of overlap between the frames, according to an embodiment of the present invention.

FIG. 2c shows an example of a flow chart demonstrating the construction of an image panorama from a plurality of images when the value of K is adaptively changed based on the amount of overlap between the frames, according to an embodiment of the present invention.

The flow chart of FIG. 2c only represents one possible scenario among others. In a method according to an embodiment of the present invention, in a first step 53, all N captured frames are stored in a memory and registered consecutively.

In a next step 54, track moving objects are detected in all N frames and the frame quality is estimated for these N frames. In a next step 55, first K frames are selected for evaluation based on a suitable frame overlap criterion (K is variable). In a next step 56, the best frame out of K frames is chosen.

In a next step 57, it is ascertained whether the last captured frame is chosen. If that is not the case, in a next step 58, next K frames after last chosen frame are selected using a suitable frame overlap criterion and the process goes back to step 56. If, however, it is ascertained that the last captured frame is chosen, in a next step 59, the image panorama is constructed from all chosen best frames.

Figure 3:
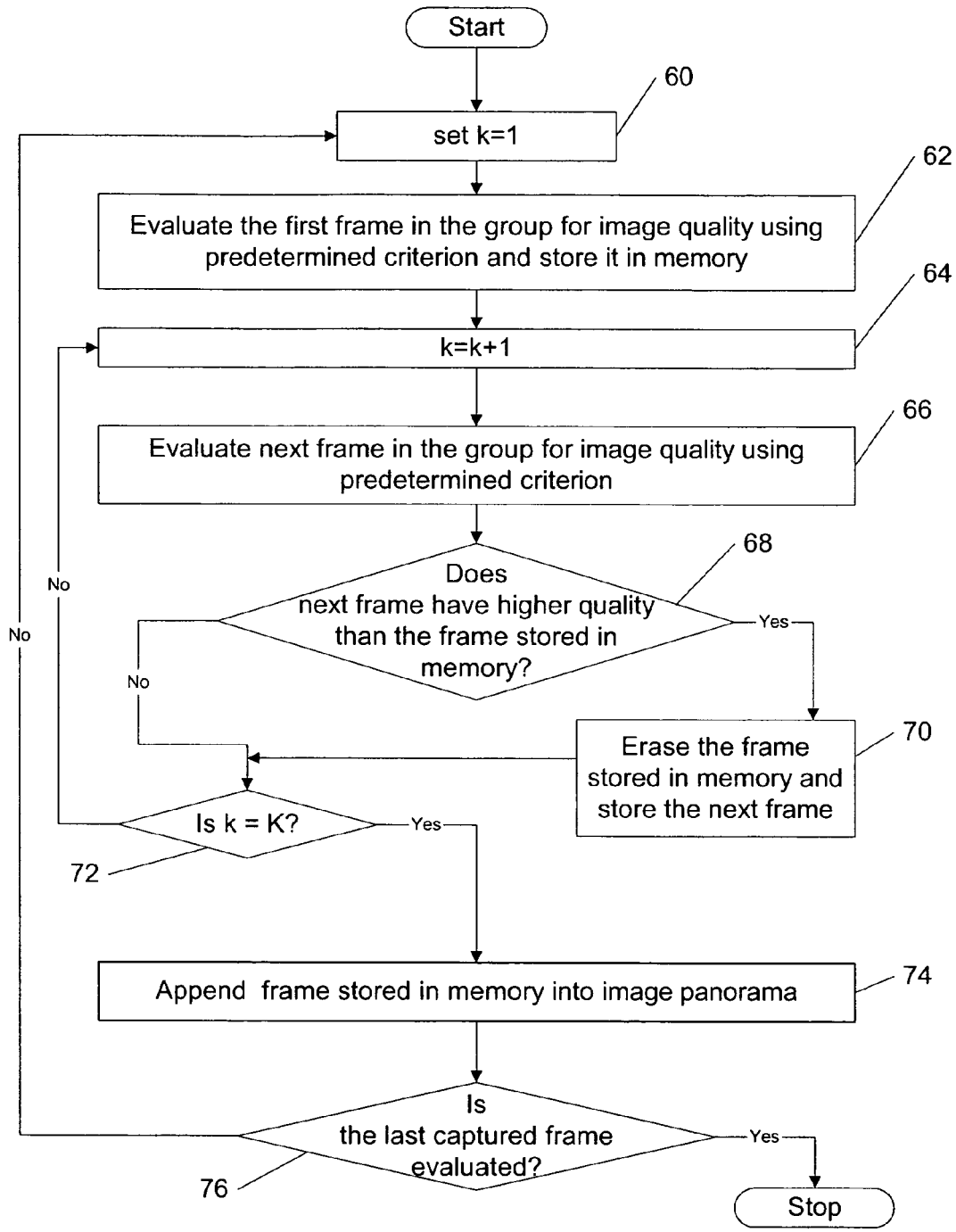
FIG. 3 is a flow chart demonstrating constructing an image panorama from a plurality of images on-line, according to an embodiment of the present invention.
Figure 4:
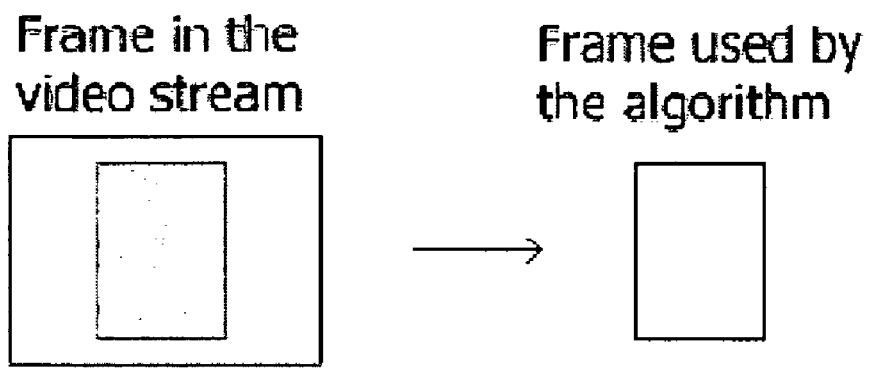
FIG. 4 is a schematic representation of a frame, wherein only the central part of each frame is actually used in composing the image panorama; according to an embodiment of the present invention.

FIG. 3 shows an example of a flow chart demonstrating constructing an image panorama from a plurality of images on-line, according to an embodiment of the present invention. This approach has minimum memory requirements for performing panorama imaging, since only one frame should be stored in its memory at a time through the evaluation process.

The flow chart of FIG. 3 only represents one possible scenario among others. Detailed description of the steps depicted in FIG. 3 is provided above. In a method according to an embodiment of the present invention, in a first step 60, the parameter k, indicating the number of the frame in the selected group of frames for evaluation, is set to one (k=1). In a next step 62, the first frame in the group is captured and evaluated for image quality using predetermined criterion and then stored in the memory. In a next step 64, the value of k is set to k=k+1. In a next step 66, the next frame in the group is evaluated for image quality using the predetermined criterion.

In a next step 68, it is ascertained whether the next frame has higher quality than the frame stored in the memory. If that is the case, in a next step 70, the frame stored in memory is erased and the next frame (which is evaluated in step 66) is stored in the memory and the process goes to step 72. However, if it is ascertained that the next frame does not have higher quality than the frame stored in the memory, in a next step 72, it is ascertained whether the parameter k is at its maximum allowed value for the number of frames in the evaluation group (e.g., predetermined value K). It is noted that K can be constant or variable, according to the embodiments of the present invention as discussed above (e.g., see FIGS. 1a and 1b). If k=K, the process goes back to step 64. If however, it is ascertained that k<K, in a next step 74, the frame stored in the memory is appended to the image panorama. In a next step 76, it is ascertain whether the last captured frame is evaluated. If that is the case, the process stops. If, however, it is ascertained that the last captured frame is not evaluated, the process goes back to step 60 and the next group of consecutive frames will be evaluated.

The image panorama is constructed by successively appending selected frames as they are captured by the video camera. In practice some problems may occur due to geometric deformations close to the frame boundary. For this reason, according to one embodiment of the present invention, it is recommended to include into the panorama only the central part of each frame, as it is exemplified in FIG. 4.

Figure 5:
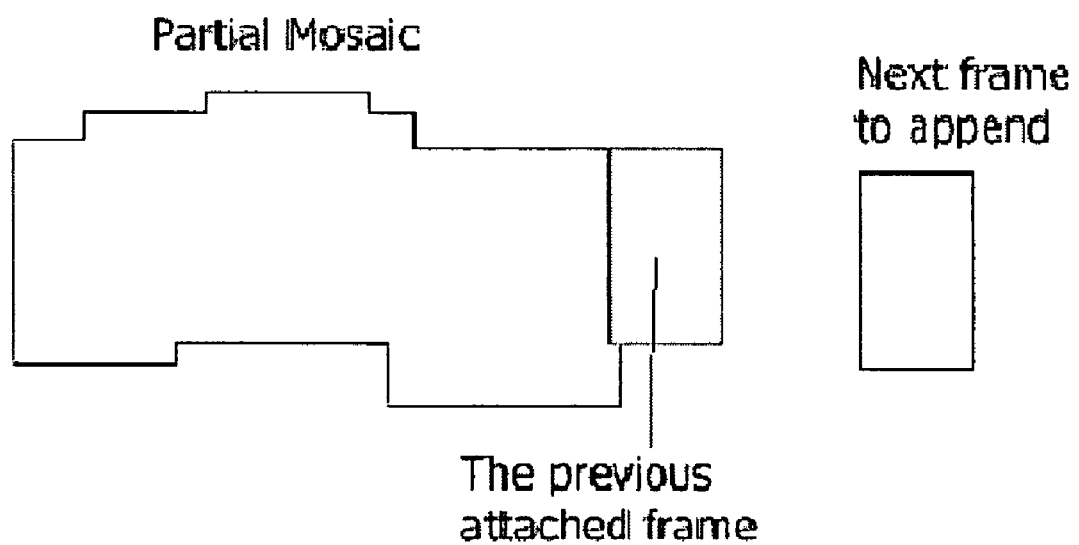
FIG. 5 is a schematic representation of the process of image panorama creation by appending the selected frames from each group of K captured frames, according to an embodiment of the present invention.

The highest level of the algorithm can be described as a select-and-append process, where the already existing part of the mosaic image is appended with frames that produce the best image quality for the whole mosaic, as illustrated in FIG. 5. The mosaic creation may either take the first frame as the reference frame, or choose the reference frame among the first group of K frames captured by the camera.

Figure 6:
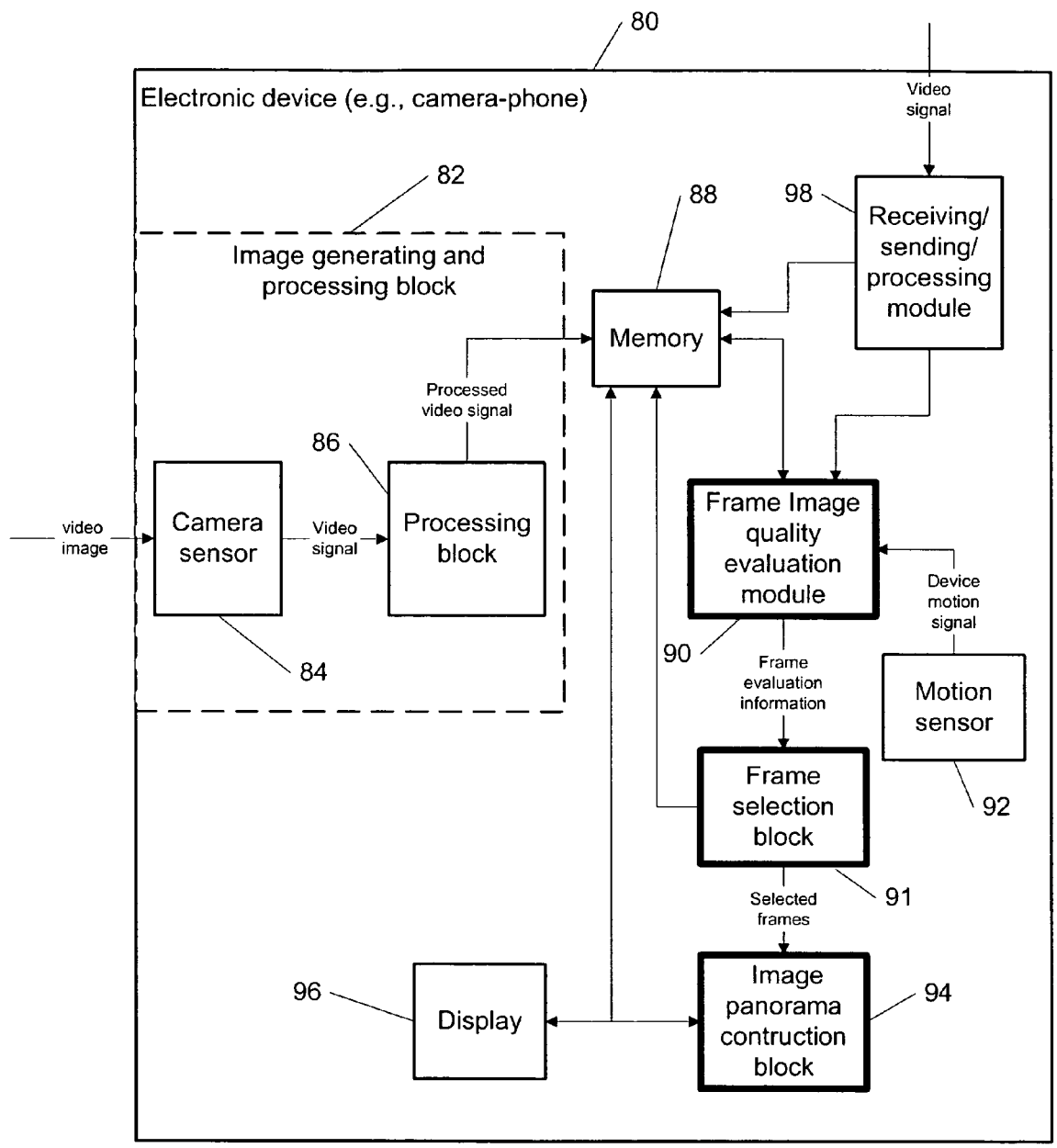
FIG. 6 is a block diagram of an electronic device adapted for constructing an image panorama from a plurality of images, according to an embodiment of the present invention.

FIG. 6 illustrates an example among others of a block diagram of an electronic device 80 (e.g., a camera-phone) adapted for constructing an image panorama from a plurality of images, according to an embodiment of the present invention. The device 80 can operate on-line and off-line using images created by the image generating and processing block 82 (e.g., using camera sensor 84 and a processing block 86), stored in a memory 88 and process them using, e.g., the procedure outlined in the flow charts of FIG. 2a, 2b or 3. Also the electronic device 80 can operate on-line (as well as off-line) using, e.g., the receiving/sending/processing block 98 (which typically includes transmitter, receiver, CPU, etc.) to receive video frames externally and process them using, e.g., the procedure outlined in the flow chart of FIG. 2a, 2b or 3.

The frame quality evaluation for both off-line and on-line cases can be performed by a frame image quality evaluation module 90 which provides frame evaluation information to a frame selection block 91. After selecting the appropriate frame using the predetermined rules, the selected frame is appended to the image panorama by the image panorama construction block 94. After completion, the image panorama can be stored in the memory 88 and/or displayed on a display 96. A motion sensor 92 can provide information on the motion of the camera sensor 84 capturing the plurality of images used for constructing the image panorama. The module 90 can be also used to adjust K, the number of evaluated frames in one group, using image quality evaluation and/or input from the block 92 using, e.g., the procedure outlined in the flow chart of FIG. 2b.

According to an embodiment of the present invention, the block 90, 91 or 94 can be implemented as a software or a hardware block or a combination thereof. Furthermore, the block 90, 91, or 94 can be implemented as a separate block or can be combined with any other block of the electronic device 80 or it can be split into several blocks according to their functionality.

The embodiments of the present invention mainly address the case when the image panorama is constructed from a set of video frames rather than from a few, almost disjoint, pictures. The difference is that the consecutive video frames captured at normal frame rates (e.g., >10 fps) contain large overlapping areas. Because of this, it is very likely that the same portion of the scene is actually present in several consecutive frames from which only one is selected to include into the image panorama. This allows constructing a higher visual quality image panorama than the approaches proposed in prior art which typically combine all image frames captured from the scene. This also results in lower complexity than previous approaches since only a reduced number of image frames are used in order to create the image panorama.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   dividing a plurality of captured images into groups, each group comprising a number of consecutive frames;
   evaluating by an electronic device, image quality of said number of consecutive frames for said each group out of the plurality of said captured images using a predetermined criterion, wherein said number is an integer of at least a value of two;
   selecting by said electronic device, one frame out of said evaluated frames with the best image quality from said each group using a predetermined rule; and
   appending by said electronic device, said one frame from said each group to other selected frames for constructing an image panorama.

2. The method of claim 1, wherein said number is a predetermined number of a constant value for all said groups.

3. The method of claim 1, wherein said number is variable for said groups.

4. The method of claim 3, wherein said number is selected in response to an amount of motion of a sensor capturing said K consecutive frames during said capturing using a pre-selected criterion.

5. The method of claim 3, wherein said number is assigned an initial value and then is iterated during said evaluating by monitoring a relative motion speed of features in adjacent frames using a pre-selected rule.

6. The method of claim 5, wherein, using said pre-selected rule, said number is increased by a pre-selected value when said relative motion speed is smaller than a threshold value or said number is decreased by a further pre-selected value when said relative motion speed is larger than a further threshold value.

7. The method of claim 1, wherein said plurality of images are stored in a memory to perform said evaluating, selecting and appending.

8. The method of claim 1, wherein said evaluating, selecting and appending are performed by the electronic device by accessing said plurality of images through network communications.

9. The method of claim 1, wherein during said evaluating image quality of said number of the consecutive frames only one frame at a time is stored in a memory.

10. The method of claim 1, wherein said evaluating image quality for each of said number of the consecutive frames uses the predetermined criterion by evaluating at least one of the following four image characteristics:
    a sharpness,
    a registration accuracy,
    an amount of overlap with other frames,
    a type and an amount of motion.

11. The method of claim 10, wherein said predetermined criterion comprises all four image characteristics.

12. The method of claim 1, wherein said evaluating, selecting and appending are performed by the electronic device, which is a digital camera, a communication device, a wireless communication device, a portable electronic device, a mobile electronic device or a camera phone.

13. The method of claim 1, wherein boundary of the selected frame are excluded and substantially only a central part of said selected frame is appended to said other selected frames.

14. The method of claim 1, wherein said selected frame is stored after said selecting and appended to said image panorama only after all frames to be appended to said image panorama out of said plurality of images are selected.

15. The method of claim 1, wherein said one frame is appended to previously selected frames right after said selecting.

16. A computer readable storage medium stored with code thereon for execution by a processor, wherein said code comprises instructions for performing the method of claim 1.

17. An electronic apparatus, comprising:
a processor and memory including computer program code, the memory and the computer program code configured to, with the processor, cause the electric apparatus at least to:
evaluate image quality for each group comprising a number of consecutive frames out of a plurality of images using a predetermined criterion, wherein said number is an integer of at least a value of two, wherein said plurality of captured images is divided into said groups;
select one frame out of said each group with the best image quality using a predetermined rule; and
append said one frame for each said group to other selected frames for constructing an image panorama.

18. The apparatus of claim 17, wherein the memory and the computer program code are further configured to, with the processor, cause the electronic apparatus at least to further perform:
store a selected frame after selection and
append said selected frame to said image panorama only after all frames to be appended to said image panorama out of said plurality of images are selected.

19. The apparatus of claim 17, wherein the memory and the computer program code are further configured to, with the processor, cause the electronic apparatus at least to further perform:
append said one frame to previously selected frames right after selection.

20. The apparatus of claim 17, wherein said number is a predetermined number of a constant value for all said groups.

21. The apparatus of claim 17, wherein said number is variable for said groups.

22. The apparatus of claim 21, wherein said number is selected in response to an amount of motion of a sensor capturing said K consecutive frames during said capturing using a pre-selected criterion.

23. The apparatus of claim 21, wherein said number is assigned an initial value and then is iterated during said evaluating by monitoring a relative motion speed of features in adjacent frames using a pre-selected rule.

24. The electronic apparatus of claim 17, wherein
the memory stores said plurality of images.

25. The apparatus of claim 17, wherein said apparatus accesses said plurality of images through network communications.

26. The apparatus of claim 25, wherein during evaluation of image quality of said number of the consecutive frames only one frame at a time is stored in said memory of said apparatus.

27. The apparatus of claim 17, wherein evaluation of image quality for each of said number of the consecutive frames uses the predetermined criterion by evaluating at least one of the following four image characteristics:
a sharpness,
a registration accuracy,
an amount of overlap with other frames,
a type and an amount of motion.

28. The electronic apparatus of claim 17, wherein said electronic apparatus is a digital camera, a communication device, a wireless communication device, a portable apparatus, a mobile electronic device or a camera phone.

29. A system adopted for constructing an image panorama from a plurality of images, comprising:
a camera that captures a plurality of images; and
an electronic device, comprising:
a frame image quality evaluation module that evaluates image quality for each group comprising a number of consecutive frames out of a plurality of images using a predetermined criterion, wherein each of said number of the consecutive frames is provided to the electronic device through a network communication said number being an integer of at least a value of two, and wherein said plurality of captured images is divided into said groups;
a frame selection module that selects one frame out of said each group with the best image quality using a predetermined rule; and
an image panorama construction block that appends said one frame for each said group to other selected frames for constructing an image panorama.

30. The system of claim 29, wherein said network communications are network communications over Internet.

31. The system of claim 29, wherein said means for capturing is a part of said electronic device or is separate from said electronic device.

32. An electronic apparatus, comprising:
means for evaluating image quality for each group comprising a number of consecutive frames out of a plurality of images using a predetermined criterion, wherein said number is an integer of at least a value of two, wherein said plurality of captured images is divided into said groups;
means for selecting one frame out of said each group with the best image quality using a predetermined rule; and
means for appending said one frame for each said group to other selected frames for constructing an image panorama.

33. The apparatus of claim 32, wherein said means for evaluating is a frame image quality evaluation module, said means for selecting is a frame selection module, and said means for appending is an image panorama construction block.

* * * * *

UNITED STATES PATENT AND TRADEMARK OFFICE
CERTIFICATE OF CORRECTION

| | | |
|---|---|---|
| PATENT NO. | : 7,860,343 B2 | Page 1 of 1 |
| APPLICATION NO. | : 11/402306 | |
| DATED | : December 28, 2010 | |
| INVENTOR(S) | : Marius Tico et al. | |

It is certified that error appears in the above-identified patent and that said Letters Patent is hereby corrected as shown below:

In column 11, line 21 (claim 18, line 1) --electronic-- should be inserted before "apparatus".
In column 11, line 29 (claim 19, line 1) --electronic-- should be inserted before "apparatus".
In column 11, line 35 (claim 20, line 1) --electronic-- should be inserted before "apparatus".
In column 11, line 37 (claim 21, line 1) --electronic-- should be inserted before "apparatus".
In column 11, line 39 (claim 22, line 1) --electronic-- should be inserted before "apparatus".
In column 11, line 43 (claim 23, line 1) --electronic-- should be inserted before "apparatus".
In column 11, line 49 (claim 25, line 1) --electronic-- should be inserted before "apparatus".
In column 11, line 52 (claim 26, line 1) --electronic-- should be inserted before "apparatus".
In column 12, line 1 (claim 27, line 1) --electronic-- should be inserted before "apparatus".

Signed and Sealed this
Twenty-sixth Day of April, 2011

David J. Kappos
*Director of the United States Patent and Trademark Office*